United States Patent [19]

Greene et al.

[11] Patent Number: 4,710,912
[45] Date of Patent: Dec. 1, 1987

[54] AIR CUSHION-OPTICAL DATA READ HEAD

[76] Inventors: Hugh W. Greene, P.O. Box 8, Somerville, Ala. 35670; James D. Holder, 707 Graycroft Dr.; James A. Knaur, 8003 Benavoya, Apt. M 101, both of Huntsville, Ala. 35802

[21] Appl. No.: 870,217

[22] Filed: Jun. 2, 1986

[51] Int. Cl.⁴ .............................................. G11B 3/10
[52] U.S. Cl. .................................... 369/218; 369/18; 369/244
[58] Field of Search ............... 369/244, 246, 247, 248, 369/249, 255, 251, 252, 218, 18, 292

[56] References Cited

U.S. PATENT DOCUMENTS

| 1,891,227 | 12/1932 | Friebus | 369/218 |
| 3,666,896 | 5/1972 | Lane | 369/244 |
| 3,830,505 | 8/1974 | Robinow | 369/218 |
| 3,835,262 | 9/1974 | Moritz | 369/251 |
| 4,079,261 | 3/1978 | Mullin | 369/244 |

Primary Examiner—Steven L. Stephan
Attorney, Agent, or Firm—Freddie M. Bush; James T. Deaton

[57] ABSTRACT

An air cushion-optical data read head that includes an optical pick-up system for reading data stored on the walls of an engraved V-groove disc or record, air means for causing the read head to hover above the surface of the record, and air jet means for guiding the head about the V-groove of the record.

4 Claims, 3 Drawing Figures

4,710,912

AIR CUSHION-OPTICAL DATA READ HEAD

DEDICATORY CLAUSE

The invention described herein may be manufactured, used, and licensed by or for the Government for governmental purposes without the payment to us of any royalties thereon.

BACKGROUND OF THE INVENTION

In the past, devices for reading data stored on a disc such as a V-grooved record has involved a mechanical device such as a needle that engages the groove of the record to retrieve the data stored on the groove of the record. In systems of this type, the record and mechanical needle are subject to wear and further the groove is subjected to the accumulation of dust and other foreign matter thereon which is not desirable. Therefore, there is a need for a read head in which there is no physical contact of the read head with the V-groove of the record in order to minimize wear of the record.

With the above need in mind, it is an object of this invention to provide a read head that utilizes gas guiding and support means for the read head and optical pickup means for reading the information stored in the groove of a record.

Another object of this invention is to provide a read head which is accurately guided and caused to follow the V-groove of a record.

Still another object of this invention is to provide a read head in which the groove of the record is cleaned as the head is guided through the groove structure of the record.

Still a further object of this invention is to provide a read head which is supported on a cushion of air just above the surface of the record.

A still further object of this invention is to provide a read head that uses a pair of optical pick-ups for retrieving the information reflected from the V-groove of a record.

Other objects and advantages of this invention will be obvious to those skilled in this art.

SUMMARY OF THE INVENTION

In accordance with this invention, an air cushion-optical read head is provided in which the read head is adapted to be mounted to a conventional pick-up arm and includes a plenum chamber which is provided with air to cause the read head to hover over the surface of a disc and also includes a capillary tube that directs a stream of air into the V-groove of a record for guiding the read head along the path of the V-groove of the record and an optical pick-up system that has dual fiber-optic light guides with dual lens for focusing light from the light guides onto opposite walls of the V-groove in the record and returning specular reflection of the light-beams from the V-groove walls directly back into the lens and light guides where it is filtered out and retrieved by electro-optical techniques of conventional construction for retrieving the data on the record.

DESCRIPTION OF THE PREFERRED EMBODIMENT

Figure 1:
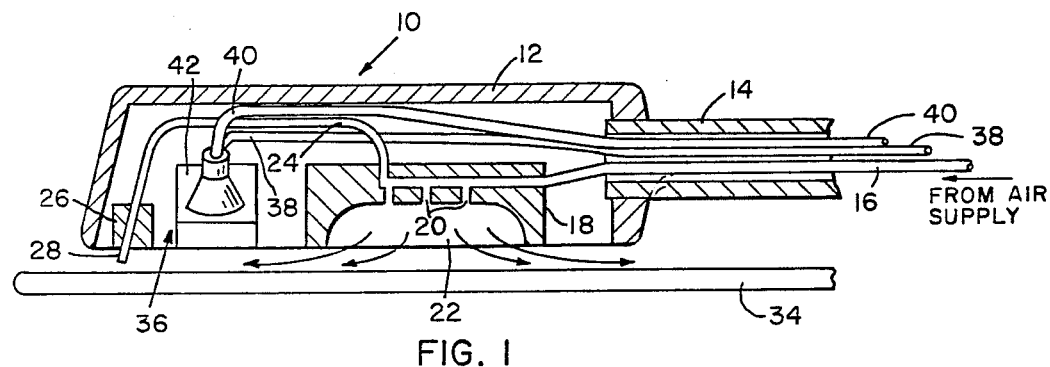
FIG. 1 is a sectional view illustrating the structure of the read head.
Figure 2:
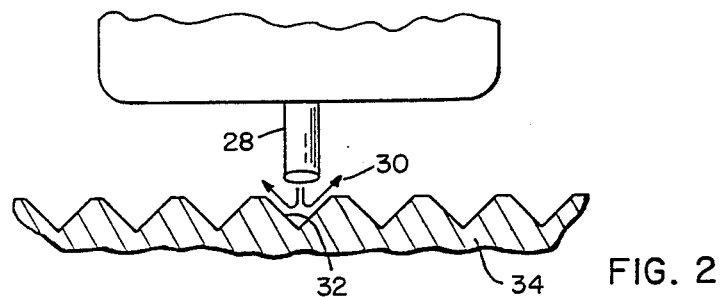
FIG. 2 is an end view, partially in section and illustrating details of the groove-guiding technique.

Referring now to the drawings, an air cushion-optical data read head 10 includes a housing structure 12 which is connected in a conventional manner to a conventional pickup arm 14. An inlet supply tube 16 is mounted in pickup arm 14 and is connected to plenum chamber structure 18 for providing air through passages 20 in plenum chamber structure 18 to plenum chamber 22 at one side of plenum chamber structure 18. A tube 24 is also connected with the air supply to plenum chamber structure 18 and is supported at one end by support structure 26 that is connected to housing 12 in a conventional manner. End 28 of tube 24 is formed as a capillary tube for injecting air out the end thereof as illustrated at 30 in FIG. 2. This air 30 is injected into V-groove 32 of disc 34 and serves to guide head 10 relative to V-groove 32. This is accomplished by capillary tube 28 extending near the recording surface of groove 32 and by the tiny jet at jet end 28 which is approximately ½ the width of the top of the V-groove in the recording surface of disc 34. Due to air 30 being directed into V-groove 32 and due to the symmetry of the V-groove and the Bernoulli effect, the jet of air injected into V-groove 32 will maintain read head 10 centered relative to V-groove 32 as the groove spirals toward the center of the disc or record.

Figure 3:
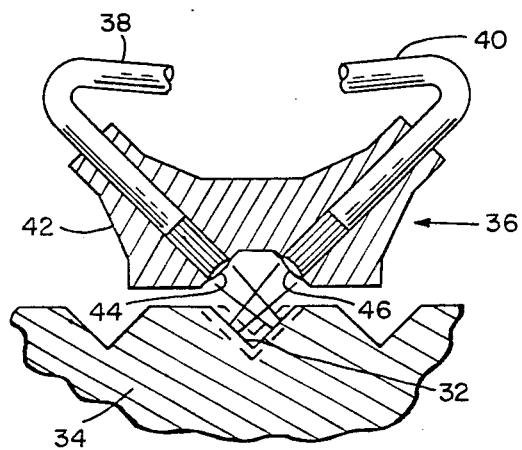
FIG. 3 is an end sectional view illustrating the optical pick-up utilized in the read head.

An optical pick-up system 36 for read head 10 has a pair of fiber-optic light guides 38 and 40 that are mounted at one end in a conventional manner relative to support structure 42 that in turn is supported in a conventional manner relative to housing structure 12. Optical pick-up system 36 has fiber-optic light guides 38 and 40 attached to support structure 42 so that they are perpendicular to the walls of V-groove 32. Lenses 44 and 46 are mounted relative to support 42 in a conventional manner and focus light from light guides 38 and 40 to opposite walls of V-groove 32 and specular reflection of light-beams from the walls of V-groove 32 return energy directly back into lens 44 and 46 and into light guides 38 and 40 that furnish the source of light. These reflected beams are returned through light guides 38 and 40 toward the source that supplied the light in light guides 38 and 40. As the walls of V-groove 32 undulate (see dashed lines in FIG. 3) with the inscribed data, there is a doppler-shift of the frequency and phase of the returned light energy as compared to the source frequency. This reflected wave is separated from light guides 38 and 40 by beam-splitters or similar means (not shown) and the data is retrieved by electro-optical technique (not shown) that detect frequency or phase shift of the reflected light energy or of a modulation that may be impressed upon the light beam.

In operation, with disc or record 34 being turned on a turntable in a conventional manner, with air being supplied through inlet tube 16 to chamber 22 and capillary end 28, read head 10 will hover just above the surface of disc 34 on a cushion of air and as disc 34 is rotated the jet of air through capillary tube end 28 will guide head 10 around groove 32. As head 22 is being guided, light through fiberoptic light tubes 38 and 40 will be reflected from opposite sides of groove 32 back through lens 44 and 46 and light guides 38 and 40 to the beam-splitters or other similar means that retrieve the data from groove 32 and utilizes this data for reproducing the information recorded on groove 32.

It can be appreciated that this system produces an effectively massless playing needle of infinite compliance and will incur no wear to the recording being played since there is no physical contact with disc 34. A collateral advantage is also appreciated since any existing dust on the disc or record will be blown away by the air that is supplied to chamber 22 and capillary tube end 28 that causes read head 10 to be supported on the cushion of air before the optical pick-up system scans the groove of the record or disc.

We claim:

1. An air cushion-optical data read head comprising a housing structure with one side of said housing structure being adapted for facing a disc, said one side of said housing structure having a chamber defined thereat with an air supply means connected to said chamber, a capillary tube connected to said air supply means and being designed to injet air from said air supply means into a V-groove of a disc to guide said head to cause said head to track the V-groove of the disc, and an optical pick-up system mounted in said housing structure and including fiber-optic light guides with lens at one end of each of the light guides and being arranged for projecting light transmitted through said light guides onto opposite sides of the V-groove of the disc, said light being adapted to be reflected from opposite sides of the V-groove and back through said lens and said light guides for being filtered out and utilized as data for reproducing a recording on the disc.

2. An air cushion-optical data read head as set forth in claim 1, wherein said one end of said light guides are mounted to be perpendicular to the sides of the V-groove, and said optical pick-up system is located between said chamber and an end of said capillary tube.

3. An air cushion-optical data read head as set forth in claim 2, wherein said capillary tube delivers a jet of air at said end and said jet having a diameter approximately ½ the width of the V-groove 4. An air cushion-optical data read head comprising; an optical pick-up system for reading data stored on the walls of an engraved V-groove record, air means for causing said read head to hover above the surface of the record, and capillary air jet means for injecting air into the V-groove of the record and onto opposite walls of the V-groove for guiding said read head and thereby cause the read head to track the V-groove of the record.

* * * * *